United States Patent
Baily et al.

(10) Patent No.: US 7,210,940 B2
(45) Date of Patent: May 1, 2007

(54) CONNECTOR WITH INDUCTIVE COUPLING

(75) Inventors: Greg Baily, Cardiff (GB); Christopher Thomas Leyson, Cardiff (GB)

(73) Assignee: Huntleigh Technology PLC (GB)

( * ) Notice: Subject to any disclaimer, the term of this patent is extended or adjusted under 35 U.S.C. 154(b) by 0 days.

(21) Appl. No.: 10/535,138

(22) PCT Filed: Nov. 17, 2003

(86) PCT No.: PCT/GB03/04986

§ 371 (c)(1),
(2), (4) Date: Feb. 27, 2006

(87) PCT Pub. No.: WO2004/047127

PCT Pub. Date: Jun. 3, 2004

(65) Prior Publication Data

US 2006/0148278 A1   Jul. 6, 2006

(30) Foreign Application Priority Data

Nov. 19, 2002   (GB) .................................. 0226896.9

(51) Int. Cl.
*H01R 11/30* (2006.01)
(52) U.S. Cl. ..................................................... 439/38
(58) Field of Classification Search ............. 439/38–40
See application file for complete search history.

(56) References Cited

U.S. PATENT DOCUMENTS 3,995,209 A * 11/1976 Weston ........................ 323/355
4,838,797 A    6/1989  Dodier
5,158,932 A   10/1992  Hirschkoff et al.
6,246,896 B1   6/2001  Dumoulin et al.
6,517,476 B1 *  2/2003  Bedoya et al. ................. 600/25

FOREIGN PATENT DOCUMENTS

DE    196 21 003 A   11/1997
GB      1398224 A    6/1975

* cited by examiner

*Primary Examiner*—Michael C. Zarroli
(74) *Attorney, Agent, or Firm*—Craig A. Fieschko, Esq.; DeWitt Ross & Stevens S.C.

(57) ABSTRACT

The inductive coupling for transferring electrical energy to or from a transducer and measuring circuit, consists of a male connector part (2) and a female connector part (10). The male part (2), includes a single layer solenoid (7) wound on a ferromagnetic rod (6), the ends of the solenoid (5a and 5b) connected to conductors (3a and 3b) connected to an ultrasound probe (not shown) via cable (1). The female part (10) includes a single layer solenoid (11). The ends of solenoid (11) are brought out to terminals (13a and 13b) to facilitate electrical connection to the ultrasound drive electronics (not shown). The coupling provides a simple sealed signal connection between the cable connected with the transducer and the measuring circuit electronics without the disadvantages of having exposed contact surfaces. The cable connector can be replaced if desired.

19 Claims, 1 Drawing Sheet

ND WITH INDUCTIVE
CONNECTOR WITH INDUCTIVE COUPLING

FIELD OF THE INVENTION

The present invention relates to a coupling arrangement for transferring electrical energy, in particular an inductive coupling arrangement for connecting a transducer to a measuring device. The invention replaces a conventional electrical connector with an inductive coupler where the electrical signal is alternating.

BACKGROUND OF THE INVENTION

Conventional electrical connectors rely on conductors being brought into contact with one another and the quality of the contacts can deteriorate because of wear and corrosion of the contact surfaces resulting in noise affecting the transmission signals. Additionally they can result in electrical connections being exposed to the user and, in the case of medical equipment, the patient which could result in harmful circulating currents.

The transducer is normally connected to the electronics by cable connectors, and prior art transducers are usually connected to the electronics by means of a cable having electrical connections. However, electrical connectors for use with such transducers have to withstand numerous sterilisation cycles with approved sterilants and high level disinfectants. These connectors must also be immune to enzyme or detergent solutions and in many cases must be supplied with a protective cover or boot to prevent the ingress of sterilising or disinfectant solutions. Because of the sterilisation process, it is difficult to prevent corrosion or oxidation of the contact surfaces of the connectors even when covered.

In addition they must be capable of withstanding high temperatures and high pressures simultaneously, when autoclaved.

SUMMARY OF THE INVENTION

The object of the present invention is to make improvements.

Accordingly, the present invention provides a magnetic coupling for transferring electrical energy to or from at least one transducer and at least one measuring circuit, said coupling comprising a first coil of an inductive coupling arrangement connected to said transducer(s) and a second coil of the inductive coupling arrangement connected to said measuring circuit(s). Preferably, the first and second coils are enclosed in separate housings, the first housing detachably attached within the second housing. Therefore, the electrical energy is transferred without the use of electrical connectors with exposed contact surfaces and avoids the disadvantages of the deterioration of the contacts and the danger to the user.

In a preferred embodiment, the magnetic coupling comprises a cable connector with at least one transducer, the cable connector including a first housing enclosing the end of the cable, a first coil of an induction coupling arrangement electrically connected to the end of the cable within the housing, and a second housing enclosing a second coil of the inductive coupling arrangement, the housings detachably attached to make the signal coupling.

Preferably, the first housing is hermetically sealed to allow for sterilisation. Preferably, the second housing is dimensioned to allow free travel of the first housing to make the signal coupling.

More preferably, the first and second housings are held together by suitable frictional or latching means.

BRIEF DESCRIPTION OF THE DRAWINGS

An embodiment of the present invention is described below, by way of example only, with reference to the accompanying drawings in which.

DETAILED DESCRIPTION OF PREFERRED VERSIONS OF THE INVENTION

In inductive connectors, there is no direct transfer of energy from one connector to the other, for example, by means of an electrical connection. Energy is transferred magnetically between connectors in the same manner as in a transformer.

The inductive coupling consists of a male connector part including a coil wound on a magnetic core and a female connector part containing a second coil wound so as to enclose the male connector part.

Figure 1:
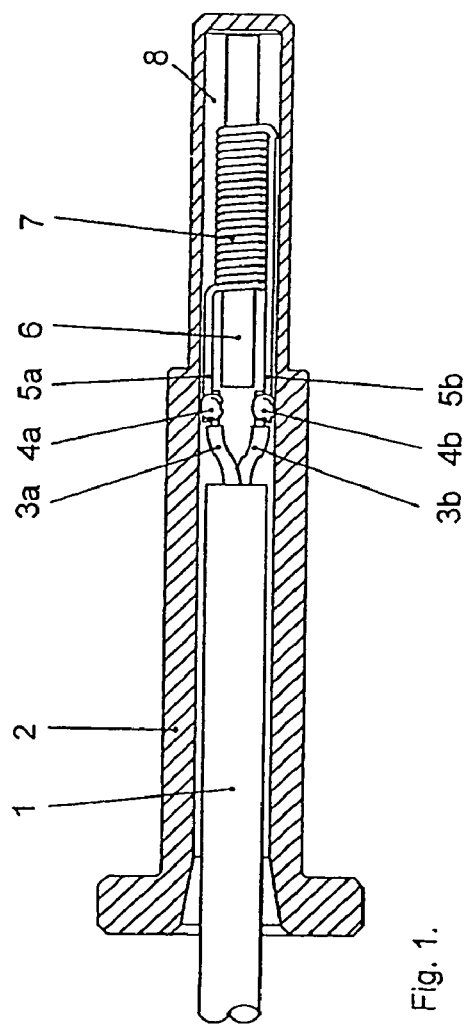
FIG. 1 shows a partial sectional view of the male part of the connector.

With reference to FIG. 1, a single layer solenoid 7 is wound on a ferromagnetic rod 6 which may be composed of Manganese-Zinc or Nickel-Zinc ferrite material chosen for the desired operating frequency range. The ends of the solenoid winding $5^a$ and $5^b$ are connected to conductors $3^a$ and $3^b$ via solder connections $4^a$ and $4^b$. Conductors $3^a$ and $3^b$ are connected to an ultrasound probe (not shown) via cable 1. Cable 1 may be of coaxial or twisted pair construction. Solenoid 7, ferromagnetic core 6 and cable terminations $4^a$, $4^b$ are surrounded by plastic housing 2. A hermetic seal is provided by filling internal void 8 with a synthetic resin (not shown). In addition the synthetic resin provides strain relief for cable 1.

Figure 2:
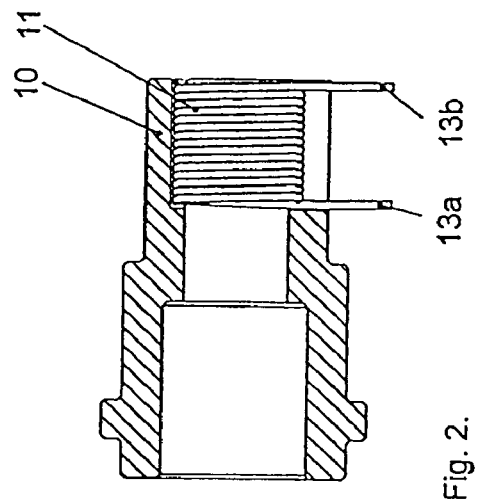
FIG. 2 shows a partial sectional view of the female part of the connector.

With reference to FIG. 2, a plastic housing 10 contains a single layer solenoid 11. Solenoid 11 is dimensioned so as to allow the free travel of the male connector part when the connectors are mated. The ends of solenoid 11 are brought out to terminals 13a and 13b to facilitate electrical connection to the ultrasound drive electronics (not shown). The solenoid 11 may be glued or bonded into the housing 10 by means of synthetic resin or similar or the housing 10 may be injection moulded around the coil 11.

Figure 3:
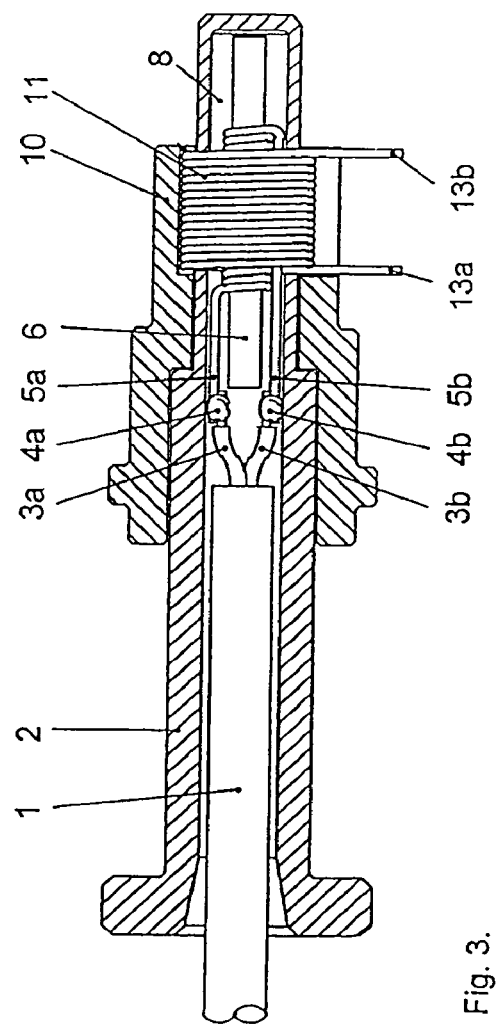
FIG. 3 shows the two parts in FIGS. 1 and 2 joined together.

FIG. 3 shows the two connector parts when they are joined together. The connectors may be held together by means of friction or a suitable latching mechanism (not shown).

Although the invention has been described with a specific configuration of the male and female parts, it will be understood that the size of the two parts and their respective coils may be adjusted to optimise the transformer magnetising and leakage inductance for different operating frequencies or different source or load impedances. Futhermore, although the specific example above relates to an ultrasound probe, the invention is equally applicable to similar electrical connections for transducers and their electronics where exposed electrical connections are undesirable. Similarly, although the example relates to a single transducer and its connection, the invention covers multiple transducers and their mutual or individual electrical connections to their electronics.

The invention claimed is:

1. A cable connector comprising:
   a. a male connector including:
      (1) a magnetic core;
      (2) a male connector coil wound about the magnetic core, and
      (3) a male connector housing surrounding the male connector coil and core, wherein the male connector housing is spaced from the male connector coil by solid synthetic material, the solid synthetic material filling the male connector housing about the male connector coil and the magnetic core;
   b. a female connector including:
      (1) a female connector housing having a female connector aperture therein sized to closely receive the male connector housing, and
      (2) a female connector coil at least partially surrounding the aperture,
      wherein the male connector coil is situated within and spaced from the female connector coil when the male connector housing is inserted within the female connector aperture.

2. The cable connector of claim 1 wherein the male connector coil is in electrical communication with an ultrasound probe.

3. The cable connector of claim 1 wherein:
   a. the male connector is situated at a first end of a cable, and
   b. the second end of the cable is connected to an ultrasound probe.

4. The cable connector of claim 1 wherein the male connector coil has coil ends connected to a first end of a cable, the first end of the cable being situated within the male connector housing, and wherein the interior of the male connector housing is filled with solid synthetic material to surround the coil ends and the first end of the cable.

5. The cable connector of claim 1:
   a. further comprising a cable having a first end connected to the male connector coil, the first end of the cable being situated within the male connector housing; and
   b. wherein the first end of the cable, the male connector coil, and the magnetic core are spaced from the male connector housing by solid synthetic material, the solid synthetic material restraining the first end of the cable, the male connector coil, and the magnetic core in fixed relationship.

6. The cable connector of claim 1 wherein the male connector coil is a single-layer coil.

7. The cable connector of claim 6 wherein the female connector coil is a single layer coil.

8. The cable connector of claim 1 wherein:
   a. further comprising a cable having:
      (1) a first end connected to the male connector coil, the first end of the cable being situated within the male connector housing; and
      (2) a second end connected to an ultrasound probe,
   b. the first end of the cable, the male connector coil, and the magnetic core are spaced from the male connector housing by solid synthetic material, the solid synthetic material restraining the first end of the cable, the male connector coil, and the magnetic core in fixed relationship.

9. The cable connector of claim 8 wherein the male connector coil is a single-layer coil.

10. The cable connector of claim 9 wherein the female connector coil is a single layer coil.

11. The cable connector of claim 1 wherein:
    a. the male connector housing has an exterior surface with an outer circumference decreasing toward a tip, and
    b. the female connector aperture of the female connector housing decreases along its depth,
    whereby the decreasing outer circumference of the exterior surface of the male connector housing is at least substantially complementarily received within the female connector aperture.

12. A cable connector comprising:
    a. a male connector including:
       (1) a magnetic core;
       (2) a male connector coil wound about the magnetic core, and
       (3) a male connector housing surrounding the male connector coil and core;
    b. a female connector including:
       (1) a female connector housing having a female connector aperture therein sized to closely receive the male connector housing, and
       (2) a female connector coil at least partially surrounding the aperture,
       wherein the male connector coil is situated within and spaced from the female connector coil when the male connector housing is inserted within the female connector aperture;
    c. a cable having a first end connected to the male connector coil within the male connector housing,
    wherein the interior of the male connector housing is filled with solid synthetic material to surround the coil ends and the first end of the cable.

13. The cable connector of claim 12 wherein the male connector coil is in electrical communication with an ultrasound probe.

14. The cable connector of claim 12 wherein the cable has a second end connected to an ultrasound probe.

15. The cable connector of claim 12 wherein the solid synthetic material fills the male connector housing about the male connector coil and the magnetic core.

16. The cable connector of claim 12 wherein the male connector coil is a single-layer coil.

17. The cable connector of claim 12 wherein the female connector coil is a single layer coil.

18. The cable connector of claim 12 wherein both the male connector coil and female connector coil are single layer coils.

19. A cable connector comprising:
    a. a male connector including:
       (1) a magnetic core;
       (2) a male connector coil wound about the magnetic core, and
       (3) a male connector housing surrounding the male connector coil and core;
    b. a female connector including:
       (1) a female connector housing having a female connector aperture therein sized to closely receive the male connector housing, and
       (2) a female connector coil at least partially surrounding the aperture,
       wherein the male connector coil is situated within and spaced from the female connector coil when the male connector housing is inserted within the female connector aperture;
    c. a cable having a first end connected to the male connector coil within the male connector housing,
    wherein the first end of the cable, the male connector coil, and the magnetic core are spaced from the male connector housing by solid synthetic material, the solid synthetic material restraining the first end of the cable, the male connector coil, and the magnetic core in fixed relationship.

* * * * *